(12) United States Patent
Kangshang et al.

(10) Patent No.: US 9,710,846 B2
(45) Date of Patent: Jul. 18, 2017

(54) METHOD, TERMINAL, AND SERVER FOR SUBMITTING AND PROCESSING ORDER

(71) Applicant: Xiaomi Inc., Beijing (CN)

(72) Inventors: Mingxue Kangshang, Beijing (CN); Junqi Lin, Beijing (CN); Lina Xu, Beijing (CN)

(73) Assignee: Xiaomi Inc., Beijing (CN)

( * ) Notice: Subject to any disclaimer, the term of this patent is extended or adjusted under 35 U.S.C. 154(b) by 41 days.

(21) Appl. No.: 14/461,501

(22) Filed: Aug. 18, 2014

(65) Prior Publication Data

US 2015/0120510 A1    Apr. 30, 2015

Related U.S. Application Data

(63) Continuation of application No. PCT/CN2014/077006, filed on May 8, 2014.

(30) Foreign Application Priority Data

Oct. 25, 2013    (CN) .......................... 2013 1 0512882

(51) Int. Cl.
  *G06Q 30/06*   (2012.01)
  *G06Q 20/32*   (2012.01)
  *H04W 4/00*    (2009.01)

(52) U.S. Cl.
  CPC ..... *G06Q 30/0635* (2013.01); *G06Q 20/3278* (2013.01); *G06Q 30/06* (2013.01); *H04W 4/008* (2013.01)

(58) Field of Classification Search
  CPC .................................................. G06Q 30/00
  See application file for complete search history.

(56) References Cited

U.S. PATENT DOCUMENTS 6,374,240 B1 *  4/2002  Walker .................. G06Q 20/20
                                                     705/15
8,800,866 B1 *  8/2014  Gromley ............... G07F 19/209
                                                     235/375

(Continued)

FOREIGN PATENT DOCUMENTS

CN        102479371 A        5/2012
CN        102938117 A        2/2013

(Continued)

OTHER PUBLICATIONS

International PCT Search Report for Application PCT/CN2014/077006, from the State Intellectual Property Office of China, mailed Jul. 30, 2014.

(Continued)

*Primary Examiner* — Kathleen Palavecino
*Assistant Examiner* — Abby Flynn
(74) *Attorney, Agent, or Firm* — Finnegan, Henderson, Farabow, Garrett & Dunner LLP

(57) ABSTRACT

A method for submitting an order for use in a terminal, includes: scanning a pre-generated near field communication (NFC) tag to obtain tag data, wherein the tag data includes at least an identification code of a third-party service provider and transaction information; generating an order according to the identification code, the transaction information, and user information; and sending the order for a server to process to obtain the identification code, the transaction information, and the user information, and to further send the transaction information and the user information to the third-party service provider corresponding to the identification code.

12 Claims, 7 Drawing Sheets

(56) References Cited

U.S. PATENT DOCUMENTS

| | | | |
|---|---|---|---|
| 2002/0049656 A1* | 4/2002 | Lancos | G06Q 20/32 705/35 |
| 2005/0036620 A1* | 2/2005 | Casden | G06F 21/6209 380/259 |
| 2005/0055283 A1* | 3/2005 | Zarovinsky | G06Q 10/087 705/26.1 |
| 2005/0125745 A1* | 6/2005 | Engestrom | G06F 1/1626 715/847 |
| 2006/0190348 A1* | 8/2006 | Ofer | G06Q 30/00 705/26.7 |
| 2007/0123215 A1 | 5/2007 | Wang et al. | |
| 2008/0004985 A1* | 1/2008 | Kang | G06Q 30/06 705/26.81 |
| 2008/0109320 A1* | 5/2008 | Kleinhans | G06Q 20/3278 705/26.1 |
| 2010/0075666 A1 | 3/2010 | Garner | |
| 2010/0294835 A1* | 11/2010 | Bam | G06Q 20/28 235/382 |
| 2010/0303230 A1 | 12/2010 | Taveau et al. | |
| 2011/0320293 A1 | 12/2011 | Khan | |
| 2012/0143703 A1 | 6/2012 | Wall et al. | |
| 2012/0246077 A1 | 9/2012 | Skaaksrud et al. | |
| 2013/0008883 A1 | 1/2013 | Arai | |
| 2013/0040571 A1 | 2/2013 | Wall et al. | |
| 2013/0134213 A1 | 5/2013 | Pallakoff et al. | |
| 2013/0151380 A1* | 6/2013 | Holt | G06Q 10/087 705/26.81 |
| 2013/0191229 A1* | 7/2013 | Rodgers | G06Q 30/06 705/15 |
| 2013/0226651 A1* | 8/2013 | Napper | G06Q 30/06 705/7.26 |
| 2013/0237152 A1* | 9/2013 | Taggar | H04B 5/00 455/41.1 |
| 2013/0304804 A1* | 11/2013 | Glasser | H04L 29/08522 709/203 |
| 2013/0317949 A1* | 11/2013 | Gu | G06Q 30/06 705/26.81 |
| 2014/0279188 A1* | 9/2014 | Powell | G06Q 30/0631 705/26.7 |

FOREIGN PATENT DOCUMENTS

| | | |
|---|---|---|
| CN | 103106591 A | 5/2013 |
| CN | 103246946 A | 8/2013 |
| CN | 103559516 A | 2/2014 |
| CN | 103559518 A | 2/2014 |
| JP | 2006-215836 A | 8/2006 |
| JP | 2008-047014 A | 2/2008 |
| JP | 2012-531660 A | 12/2012 |
| KR | 10-2007-0014859 | 2/2007 |
| KR | 20090000735 A | 1/2009 |
| KR | 20120116287 A | 10/2012 |
| KR | 20130103850 A | 9/2013 |
| RU | 2481617 C2 | 5/2013 |
| WO | WO 2013/034681 A | 3/2013 |
| WO | WO 2013/090367 A1 | 6/2013 |
| WO | WO 2013/153552 A | 10/2013 |

OTHER PUBLICATIONS

European Search Report for Application No. 14139441.0, from the European Patent Office, dated Mar. 20, 2015.

Examination Report for Application No. 14 189 441.0, issued from European Patent Office, dated Nov. 25, 2015.

English version of International PCT Search Report for Application No. PCT/CN2014/077006, from the State Intellectual Property Office of China, dated Jul. 30, 2014.

Office Action issued by the Russian Patent and Trademark Office, in Russian application No. 2015122176/08(034517), dated Jul. 29, 2016 (17 pages including translation).

Communication of the Substantive Examination Report, dated Oct. 27, 2016, in counterpart Mexican Patent Application No. MX/a/2014/008883.

* cited by examiner

METHOD, TERMINAL, AND SERVER FOR SUBMITTING AND PROCESSING ORDER

CROSS REFERENCE TO RELATED APPLICATION

This application is a Continuation of International Application PCT/CN2014/077006, filed May 8, 2014, which claims priority to Chinese Patent Application No. 201310512882.5, filed Oct. 25, 2013, the entire contents of all of which are incorporated herein by reference.

TECHNICAL FIELD

The present disclosure generally relates to the field of electronic commerce and, more particularly, to a method, a terminal, and a server for submitting and processing an order.

BACKGROUND

Near field communication (NFC), also known as short-distance wireless communication, is a short-distance high-frequency wireless communication technology, which allows non-contact point-to-point data transmission so as to exchange data among electronic devices. The NFC technology evolves from contactless radio frequency identification (RFID), is compatible downward with RFID, and is used in handheld devices, such as mobile phones, to provide machine to machine (M2M) communication.

NFC can be performed not only between two devices having NFC recognition capability, but also between an NFC device and a non-power NFC chip, also known as an NFC sticker or an NFC tag. An NFC-equipped smart phone can automatically carry out tasks by reading programs, which are pre-written by software, in an NFC tag.

Conventionally, the NFC tag can be used to modify settings of a mobile phone, send text messages, and start application programs, and implementation of the functions is limited within the mobile phone.

SUMMARY

According to a first aspect of the present disclosure, there is provided a method for submitting an order for use in a terminal, comprising: scanning a pre-generated near field communication (NFC) tag to obtain tag data, wherein the tag data includes at least an identification code of a third-party service provider and transaction information; generating an order according to the identification code, the transaction information, and user information; and sending the order for a server to process to obtain the identification code, the transaction information, and the user information, and to further send the transaction information and the user information to the third-party service provider corresponding to the identification code.

According to a second aspect of the present disclosure, there is provided a terminal, comprising: a processor; and a memory for storing instructions executable by the processor; wherein the processor is configured to: scan a pre-generated near field communication (NFC) tag to obtain tag data, wherein the tag data includes at least an identification code of a third-party service provider and transaction information; generate an order according to the identification code, the transaction information, and user information; and send the order for a server to process to obtain the identification code, the transaction information, and the user information, and to further send the transaction information and the user information to the third-party service provider corresponding to the identification code.

According to a third aspect of the present disclosure, there is provided a method for processing an order for use in a server, comprising: receiving an order sent by a terminal, the order being generated from tag data obtained by scanning a pre-generated near field communication (NFC) tag by the terminal; processing the order to obtain an identification code, transaction information, and user information in the order; and sending the transaction information and the user information to a third-party service provider corresponding to the identification code.

According to a fourth aspect of the present disclosure, there is provided a server, comprising: a processor; and a memory for storing instructions executable by the processor; wherein the processor is configured to: receive an order sent by a terminal, the order being generated from tag data obtained by scanning a pre-generated near field communication (NFC) tag by the terminal; process the order to obtain an identification code, transaction information, and user information in the order; and send the transaction information and the user information to a third-party service provider corresponding to the identification code.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In exemplary embodiments, there is provided a method for generating and processing an order using a near field communication (NFC) tag. After a terminal scans the NFC tag to generate an order for a service, the order is transmitted through a server to a third-party service provider. The order can be processed in the server so as for the third-party service provider to provide services to a user. In exemplary embodiments, the server may be maintained by a service provider other than the third-party service provider. For example, the server may be maintained by an intermediary providing a platform for business transactions between a user of the terminal and the third-party service provider.

Figure 1:
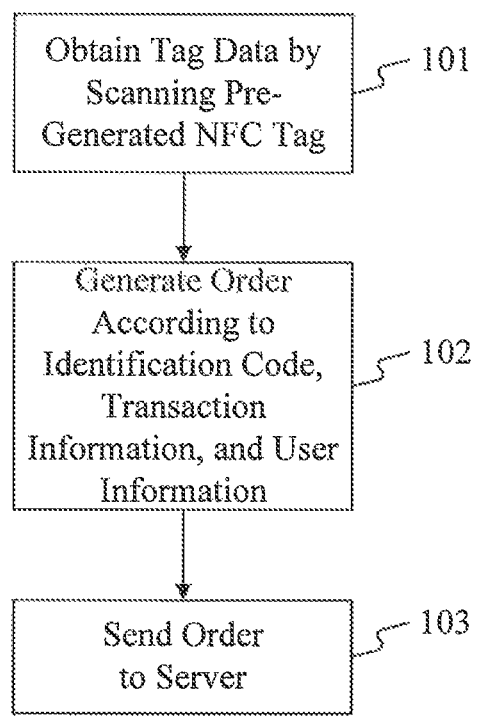
FIG. 1 is a flowchart of a method for submitting an order for use in a terminal, according to an exemplary embodiment.

FIG. 1 is a flowchart of a method 100 for submitting an order for use in a terminal, according to an exemplary embodiment. Referring to FIG. 1, the method 100 includes the following steps.

In step 101, the terminal obtains tag data by scanning a pre-generated NFC tag, wherein the tag data includes at least an identification code of a third-party service provider and transaction information.

In step 102, the terminal generates an order according to the identification code, the transaction information, and user information.

In step 103, the terminal sends the order for a server to process, such as interpret, to obtain the identification code, the transaction information, and the user information, and further to send the transaction information and the user information to the third-party service provider corresponding to the identification code, thereby to complete an operation of submitting the order.

In exemplary embodiments, the transaction information includes content of a service to be ordered by a user. For example, if the NFC tag is pre-generated for ordering take-away food from a restaurant, the transaction information can be names of food to be ordered. Also for example, if the NFC tag is pre-generated for paying a phone bill, the transaction information can be an amount of the phone bill.

In the illustrated embodiment, the tag data in the NFC tag includes an identification code of the third-party service provider and the transaction information. Accordingly, the terminal can determine the third-party service provider and generate the corresponding order to be sent to the server according to the identification code. The server identifies the third-party service provider corresponding to the order, and sends the order to the corresponding third-party service provider. Thus, time for obtaining third-party services by the user is reduced, and convenience for obtaining the third-party services is improved. In addition, since the third-party service provider can immediately begin to provide services to the user after accessing and registering with server without developing application programs or building a service website of a customer service system by itself, service cost is saved and service efficiency is improved.

In the present embodiment, before step 101, the identification code of the third-party service provider and the transaction information can be pre-written into the NFC tag. Accordingly, the identification code and the transaction information do not need to be input each time when a user places an order. By scanning the NFC tag, the identification code and the transaction information can be automatically synthesized to form an order, thus time cost of obtaining the service is reduced, and convenience for obtaining the service is improved.

In exemplary embodiments, the user information in step 102 can be obtained by the following first, second, or third methods.

In the first method, the user information is pre-stored in the NFC tag, and is obtained by scanning the NFC tag by the terminal.

For example, the user information may be encrypted, and the encrypted user information is written into the NFC tag by the terminal. When the encrypted user information is included in tag data, after obtaining the tag data by scanning the pre-generated NFC tag, the terminal decrypts the encrypted user information to obtain the user information.

In the above embodiment, the user information pre-stored in the NFC tag is encrypted, such that only the terminal can read the user information in the NFC tag after decryption, thereby providing for safety of user privacy information. Moreover, the user information is pre-stored in the NFC tag, and does not need to be input each time when the user places an order. By scanning the NFC tag, the user information can be automatically synthesized to form an order. Thus, time cost of obtaining the service by the user is reduced and convenience for obtaining the service is improved.

In the second method, the user information is obtained from the terminal locally, or from an input by the user, and the user information is not required to be encrypted. By storing the user information locally or inputting the user information by the user, privacy safety of the user is improved, time cost of obtaining the service by the user is saved, and convenience for obtaining the service is improved.

In the third method, the user information is obtained through a sensor. For example, when the user calls a taxi service provider using the terminal, the sensor can determine a location of the user based on, e.g., global positioning system (GPS) data, and provide the location as the user information to the terminal. By obtaining the user information through the sensor, accuracy and convenience for obtaining the user information are increased, and user input is reduced. Thus, time cost of obtaining the service by the user is saved, and convenience for obtaining the service is improved.

In one exemplary embodiment, the following can be pre-written in an erasable NFC tag through the terminal:

Identification Code of Third-Party Service Provider: 000001 (Restaurant A)

Transaction Information: Food Name: Cheeseburger,

User Information:

User Name: John,

Contact Number: 1234567,

Delivery Address Room 123, 6th floor, XXX Building.

Figure 2:
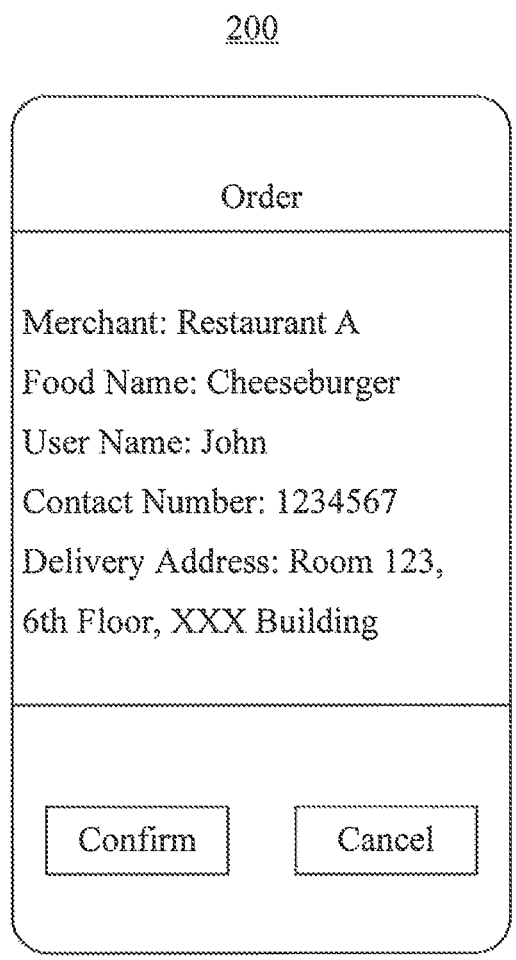
FIG. 2 is a schematic diagram of an interface of a terminal displaying an order, according to an exemplary embodiment.

When the user wants to place an order, the user can use the terminal to scan this NFC tag. For example, FIG. 2 is a schematic diagram of an interface 200 of the terminal displaying the order after the scanning, according to an exemplary embodiment. After the order is confirmed by the user, the terminal sends the order for the server to process to obtain the identification code, the transaction information, and the user information, and further to send the transaction information and the user information to Restaurant A, such that Restaurant A can deliver food to the user after receiving this order.

In the above embodiment, the user only needs to scan the NFC tag using the terminal and confirm the order displayed on the interface 200, and there is no need to input names of food to be ordered and user information every time ordering the food. Thus, time for obtaining the service by the user is reduced and convenience for obtaining the service is increased.

In exemplary embodiments, the terminal can receive in real time order status information generated in accordance with a processing situation of the order from the server or the third-party service provider. The terminal receives the order status information in real time, such that the user can know the processing situation of the order in real time. Thus, convenience for obtaining the service is further improved.

Figure 3:
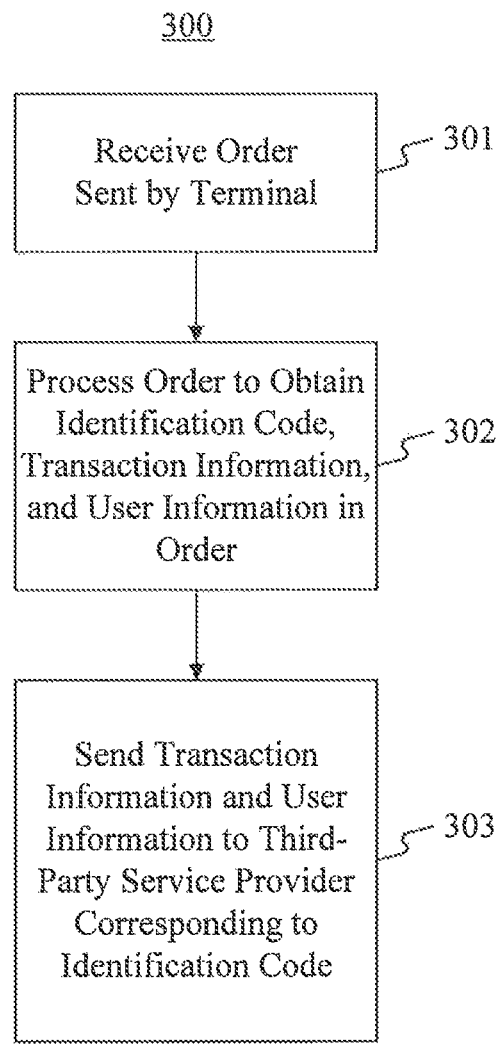
FIG. 3 is a flowchart of a method for processing an order for use in a server, according to an exemplary embodiment.

FIG. 3 is a flowchart of a method 300 for processing an order for use in a server, according to an exemplary embodiment. Referring to FIG. 3, the method 300 includes the following steps.

In step 301, the server receives an order sent by a terminal, the order being generated from tag data obtained by scanning a pre-generated NFC tag by the terminal.

In step 302, the server processes, such as interprets, the order to obtain an identification code, transaction information, and user information in the order.

In step 303, the server sends the transaction information and the user information to a third-party service provider corresponding to the identification code, to complete an order operation.

In the present embodiment, the server sends the transaction information and the user information to the corresponding third-party service provider. Thus, time for obtaining the service by the user is reduced, and convenience for obtaining the service is improved. In addition, since the third-party service provider can immediately begin to provide the service to the user after accessing and registering with the server without developing application programs or building a service website of a customer service system by itself, service cost is saved and service efficiency is improved.

In exemplary embodiments, the server further obtains order status information in accordance with a processing situation of the order, and sends the order status information to the terminal, such that the user can know the processing situation of the order in real time. Thus, convenience for obtaining the service is further improved.

In exemplary embodiments, the server performs statistics of transaction data of the third-party service provider according to the order. For example, the server performs statistics of a number of orders obtained by the third-party service provider through the server, and a total amount of payments for the orders.

In exemplary embodiments, the server performs statistics of consumption information of the user according to the order, and feeds back the consumption information of the user to the terminal. For example, the server performs statistics of a total number of orders placed by the user through the server, a first number of orders to a first third-party service provider, such as a restaurant, a second number of orders to a second third-party service provider, such as a taxi service provider, etc., and an amount of money spent on each service.

In the above embodiments, the server performs statistics of transaction data of the third-party service provider or consumption information of the user, and provides the transaction data or the consumption information of the user to the third-party service provider or the user, respectively. The third-party service provider can obtain accurate transaction data without performing statistics by itself, thus service cost is saved and service efficiency is improved. By using the consumption information provided by the server, the user can accurately know his/her consumption record, and can conveniently query a past consumption record, thus improving user experience.

Figure 4:
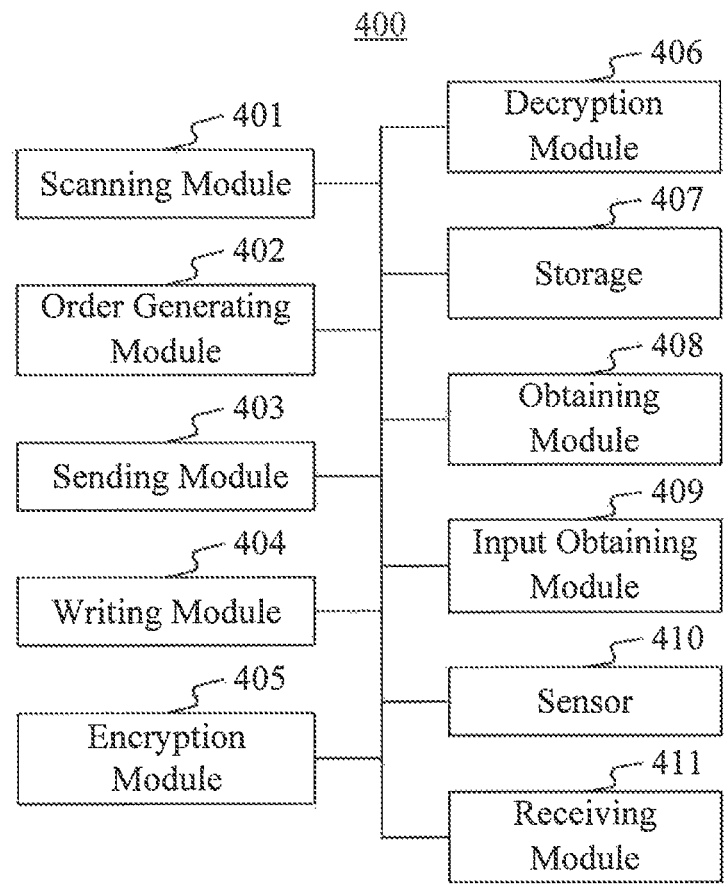
FIG. 4 is a block diagram of a terminal, according to an exemplary embodiment.

FIG. 4 is a block diagram of a terminal 400, according to an exemplary embodiment. Referring to FIG. 4, the terminal 400 includes a scanning module 401 configured to obtain tag data by scanning a pre-created NFC tag, wherein the tag data includes at least an identification code of a third-party service provider and transaction information, an order generating module 402 configured to generate an order according to the identification code, the transaction information, and user information, and a sending module 403 configured to send the order for a server to process, such as interpret, to obtain the identification code, the transaction information, and the user information, and to further send the transaction information and the user information to the third-party service provider corresponding to the identification code, thereby to complete an operation of submitting the order.

In exemplary embodiments, the terminal 400 further includes a writing module 404 configured to write the identification code of the third-party service provider and the transaction information into the NFC tag.

In exemplary embodiments, the terminal 400 further includes an encryption module 405 and a decryption module 406. The encryption module 405 is configured to encrypt the user information for the writing module 404 to write the encrypted user information into the NFC tag. The decryption module 406 is configured to decrypt the encrypted user information to obtain the user information.

In exemplary embodiments, the terminal 400 further includes a storage 407 configured to store the user information, and an obtaining module 408 configured to obtain the user information from the storage 407. Alternatively/additionally, the terminal 400 further includes an input obtaining module 409 configured to obtain the user information according to user input.

In exemplary embodiments, the terminal 400 further includes a sensor 410 configured to obtain the user information.

In exemplary embodiments, the terminal 400 further includes a receiving module 411 configured to receive in real time order status information generated in accordance with a processing situation of the order from the server or the third-party service provider.

Figure 5:
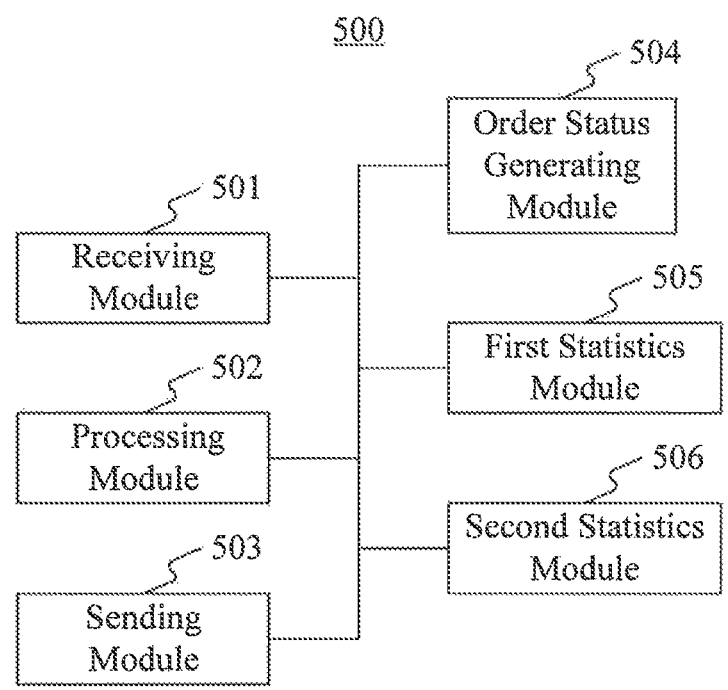
FIG. 5 is a block diagram of a server, according to an exemplary embodiment.

FIG. 5 is a block diagram of a server 500, according to an exemplary embodiment. Referring to FIG. 5, the server 500 includes a receiving module 501 configured to receive an order sent by a terminal, the order being generated from tag data obtained by scanning a pre-created NFC tag by the terminal, a processing module 502 configured to process, such as interpret, the order to obtain an identification code, transaction information, and user information in the order, and a sending module 503 configured to send the transaction information and the user information to a third-party service provider corresponding to the identification code, to complete an order operation.

In exemplary embodiments, the server 500 further includes an order status generating module 504 configured to generate order status information in accordance with a processing situation of the order. The sending module 503 is configured to send the order status information to the terminal.

In exemplary embodiments, the server 500 further includes a first statistics module 505 configured to perform statistics of transaction data of the third-party service provider according to the order, and/or a second statistics module 506 configured to perform statistics of consumption information of the user according to the order. The sending module 503 is configured to feed back the consumption information of the user to the terminal.

Figure 6:
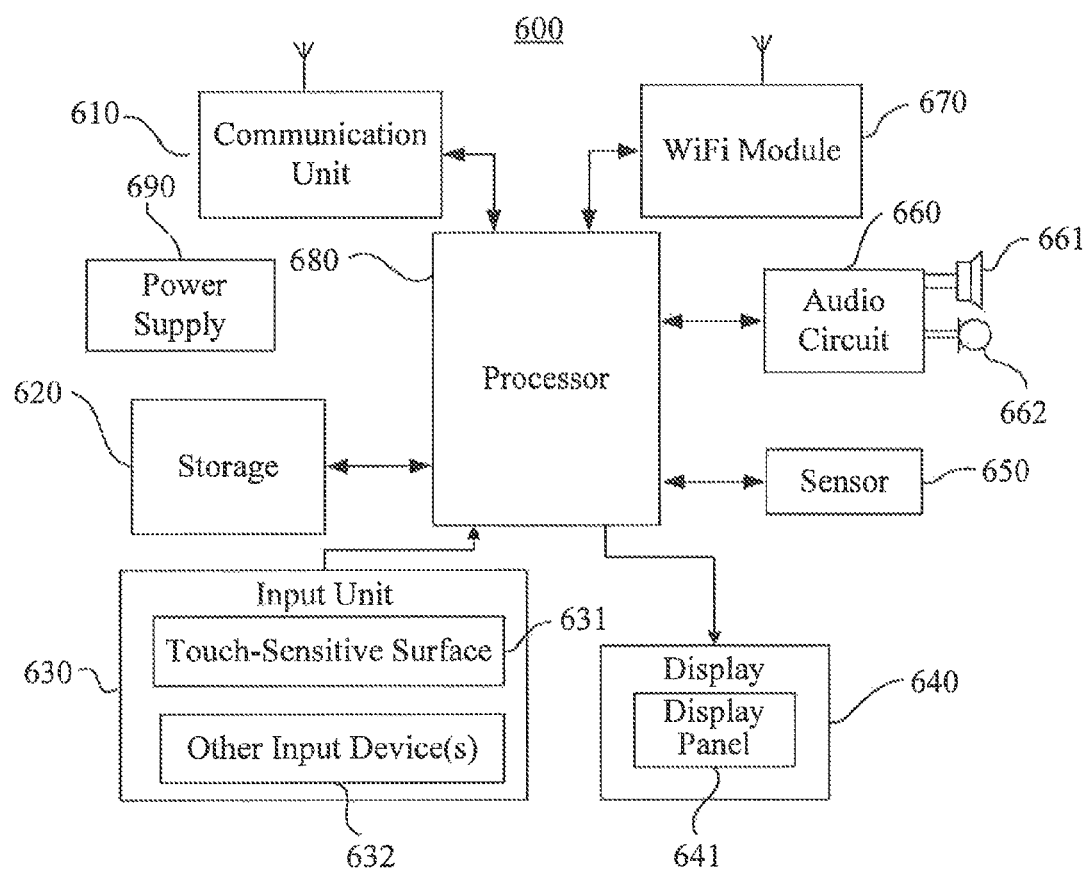
FIG. 6 is a block diagram of a terminal, according to an exemplary embodiment.

FIG. 6 is a block diagram of a terminal 600, according to an exemplary embodiment. The terminal 600 is configured to perform the method 100 (FIG. 1).

Referring to FIG. 6, the terminal 600 may include one or more of a communication unit 610, a storage 620 including one or more computer readable storage media, an input unit 630, a display 640, a sensor 650, an audio circuit 660, a wireless fidelity (WiFi) module 670, a processor 680 including one or more processing cores, and a power supply 690. Those skilled in the art could understand that the structure shown in FIG. 6 does not constitute a limitation to the terminal 600, and the terminal 600 may include more or less components than those shown in FIG. 6, or a combination of certain components, or may have different component arrangements.

The communication unit 610 is configured to receive and send signals during receiving and sending information or in a process of phone calling. The communication unit 610 may be a network communication apparatus such as a radio frequency (RF) circuit, a router, a modem, etc. For example, when the communication unit 610 is the RF circuit, the communication unit 610 receives downlink information from a base station, and sends the downlink information to the processor 680 to process. In addition, the communication unit 610 transmits uplink data to the base station. Generally, the RF circuit as the communication unit 610 includes an antenna, at least one amplifier, a tuner, one or more oscillators, a subscriber identity module (SIM) card, a transceiver, a coupler, a low noise amplifier (LNA), a duplexer, etc., but it is not limited thereto. Furthermore, the communication unit 610 may communicate with a network and other apparatuses by wireless communication. The wireless communication may use any communication standard or protocol including global system of mobile communication (GSM), general packet radio service (GPRS), code division multiple access (CDMA), wideband code division multiple access (WCDMA), long term evolution (LTE), E-mail, short messaging service (SMS) or the like, but it is not limited thereto.

The storage 620 is configured to store software programs and modules, and the processor 680 executes various functional applications and data processing by running the software programs and modules stored in the storage 620. The storage 620 may mainly include a program storing area and a data storing area. The program storing area may store an operating system, at least one application program required for functions such as a sound playing function, an image playing function or the like. The data storing area may store data such as audio data and a telephone book, etc., created in accordance with the use of the terminal 600. Furthermore, the storage 620 may include a high speed random access memory or a nonvolatile memory, for example, at least one magnetic disk storage device, a flash memory device or other nonvolatile solid-state memory devices. Correspondingly, the storage 620 may also include a storage controller, to provide the processor 680 and the input unit 630 with an access to the storage 620.

The input unit 630 is configured to receive input figure or character information, and generate a signal input of a keyboard, a mouse, an operating stick, an optical device, or a trackball related to user settings and function control. For example, the input unit 630 may include a touch-sensitive surface 631 and one or more other input apparatuses 632. The touch-sensitive surface 631, also referred to as a touch display screen or a touch panel, may collect touch operations from a user performed thereon or nearby (for example, operations on the touch-sensitive surface 631 or near the touch-sensitive surface 631 by a user using any appropriate object or accessory such as a finger, or a touch pen, etc.), and may drive a corresponding connecting device according to a preset program. For example, the touch-sensitive surface 631 may include first and second parts, i.e., a touch detection device and a touch controller. The touch detection device detects touch operations of the user, and detects signals caused by the touch operations, then transmits the signals to the touch controller. The touch controller receives touch information from the touch detection device, and converts the touch information into coordinates of touch points to be sent to the processor 680. The touch controller receives commands sent from the processor 680 and executes the commands. Furthermore, the touch-sensitive surface 631 may be realized in various types, such as a resistive type, a capacitive type, an infrared type, or a surface acoustic wave type. In addition to the touch-sensitive surface 631, the input unit 630 may also include one or more other input apparatuses 632. For example, the other input apparatuses 632 may include one or more of a physical keyboard, a function key (such as a volume control key, or a switching key, etc.), a trackball, a mouse, and an operating stick, but are not limited thereto.

The display 640 is configured to display information input by the user or information supplied to the user and various graphical user interfaces of the terminal 600. These graphical user interfaces may consist of graph, text, icon, video or any combination thereof. The display 640 may include a display panel 641. The display panel 641 may be configured by using a liquid crystal display (LCD), an organic light-emitting diode (OLED), or the like. Further, the touch-sensitive surface 631 may cover the display panel 641, and after the touch-sensitive surface 631 detects a touch operation thereon or nearby, the touch-sensitive surface 631 transmits the touch operation to the processor 680 to determine a type of the touch operation and, subsequently, the processor 680 provides a corresponding visual output on the display 641 according to the type of the touch operation. Although in FIG. 6 the touch-sensitive surface 631 and the display panel 641 be two separate parts to realize input and output functions, in some embodiments, the touch-sensitive surface 631 and the display panel 641 may be integrated to realize input and output functions.

The sensor 650 may be a light sensor, a motion sensor, or any other sensors. For example, the light sensor may include an ambient light sensor and a proximity sensor. The ambient light sensor may adjust a brightness of the display panel 141 according to a brightness of ambient light. The proximity sensor may turn off the display panel 641 and/or backlight when the terminal 600 moves to the user's ear. As an example of the motion sensor, a gravity acceleration sensor may detect values of accelerations in respective directions (such as along three-axis), and may detect a value and a direction of the gravity when in stationary state. The gravity acceleration sensor may be used in applications for identifying an attitude of the terminal 600 (such as horizontal and vertical screen switching, related games, magnetometer attitude calibration), related functions of vibration identification (such as a pedometer, a knock), etc. The terminal 600 may also be configured with other sensors such a gyroscope, a barometer, a hygrometer, a thermometer, an infrared sensor, etc.

The audio circuit 660 is coupled to a speaker 661 and a microphone 662, and may provide an audio interface between the user and the terminal 600. The audio circuit 660 may convert received audio data into electrical signals and transmit the electrical signals to the speaker 661, and then the speaker 661 converts the electrical signals into sound signals to output. On the other hand, the microphone 662 converts collected sound signals into electrical signals, and the audio circuit 660 receives the electrical signals and converts the electrical signals into audio data to output to the processor 680 for processing. The audio data is then sent to another terminal through the RF circuit as the communication unit 610, or to the storage 620 to be further processed. The audio circuit 660 may include an earplug jack, to provide communication between a peripheral headset and the terminal 600.

The WiFi module 670 can provides the user with a wireless broadband Internet access, which allows the user to receive and send emails, browse webpages, and access streaming media. Although FIG. 6 shows the WiFi module 670, it should be understood that the terminal 600 does not have to include the WiFi module 670, and may be omitted.

The processor 680 is a control center of the terminal 600 that connects various parts of the terminal 600 by using various interfaces and circuits, and executes various functions and data processing by executing the software programs and/or modules stored in the storage 620 and calling data stored in the storage 620. The processor 680 may include one or more processing cores, and may be integrated with an application processor and a modem processor. The application processor mainly processes an operating system, user interfaces, and application programs. The modem processor mainly processes wireless communication. In some embodiments, the modem processor may not be integrated into the processor 680.

The power supply 690 is configured to supply power to components of the terminal 600. For example, the power supply 690 may be logically coupled with the processor 680 by a power supply management system, thereby realizing functions such as management of charging, discharging, and power consumption by the power supply management system. The power supply 690 may also include any component such as one or more of a direct current (DC) power supply or alternating current (AC) power supply, a recharging system, a power supply failure detection circuit, a power supply converter or inverter, a power supply state indicator.

Although not shown, the terminal 600 may also include a camera, a Bluetooth module, etc.

In exemplary embodiments, there is also provided a non-transitory computer-readable storage medium including instructions, such as included in the memory 620, executable by the processor 680 in the terminal 600, for performing the method 100 (FIG. 1).

Figure 7:
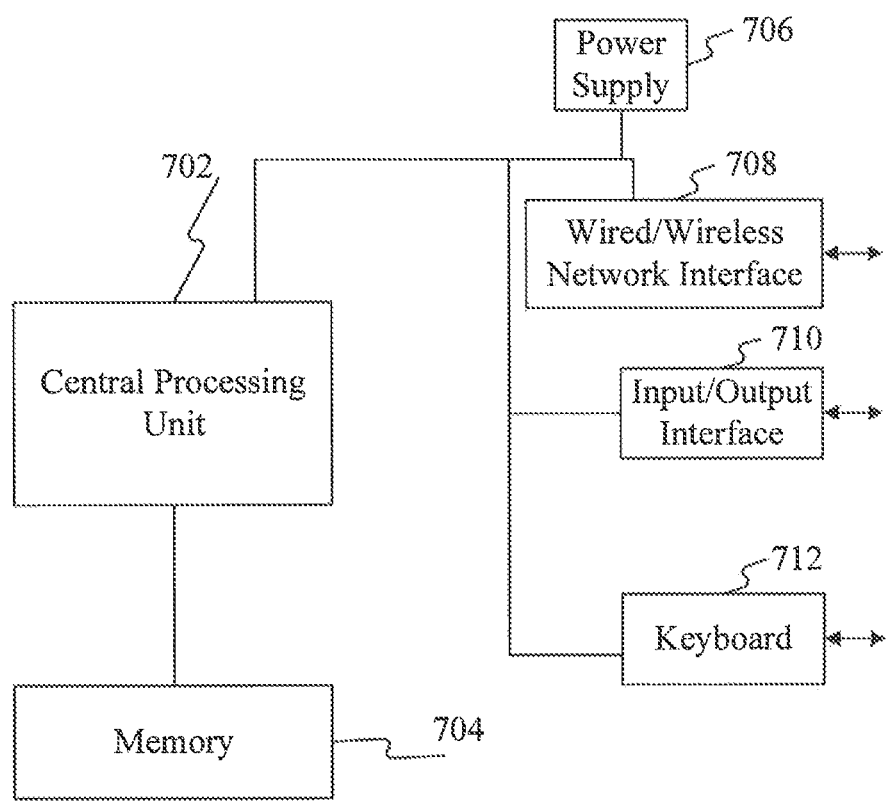
FIG. 7 is a block diagram of a server, according to an exemplary embodiment.

FIG. 7 is a block diagram of a server 700, according to an exemplary embodiment. Referring to FIG. 7, the server 700 may include a central processing unit (CPU) 702 including one or more processors and memory resources, represented by a memory 704, for storing instructions executable by the CPU 702, such as application programs. The application programs stored in the memory 704 may include one or more modules each corresponding to a set of instructions. Further, the CPU 702 is configured to execute the instructions to perform the method 300 (FIG. 3).

The server 700 may also include a power supply 706 configured to perform power management of the server 700, one or more wired or wireless network interfaces 708 configured to connect the server 700 to a network, an input/output (I/O) interface 710, a keyboard 712, etc. The server 700 may operate based on one or more operating systems stored in the memory 704 such as Windows Server, Mac OS, Unix, Linux, FreeBSD, or the like.

In exemplary embodiments, there is also provided a non-transitory computer-readable storage medium including instructions, such as included in the memory 704, executable by the CPU 702 in the server 700, for performing the method 300 (FIG. 3).

In exemplary embodiments, the above-described terminal may be various handheld apparatuses, such as a mobile phone, a personal digital assistant (PDA), and the like. The present disclosure is not limited to a particular type of terminal.

In exemplary embodiments, the above mentioned computer-readable storage medium may be a volatile memory or a nonvolatile memory, or a combination thereof. For example, but without limitation, the nonvolatile memory may include a read only memory (ROM), a programmable ROM (PROM), an electrically programmable ROM (EPROM), an electrically erasable programmable ROM (EEPROM), or a flash memory. The volatile memory may include a random access memory (RAM) which may serve as an external cache RAM memory. As an example, but without limitation, the RAM may be of various forms, such as a synchronous RAM (DRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a direct Rambus RAM (DRRAM). The computer-readable storage medium may also be a compact disk (CD), a laser disc, an optical disk, a digital versatile disc (DVD), a floppy disks, a blue-ray disk, etc.

Various illustrative logical blocks, modules and circuits described in conjunction with the present disclosure may be implemented or performed by the following components that are designed to perform the above methods: a general purpose processor, a digital signal processor (DSP), an application-specific integrated circuit (ASIC), a field programmable gate array (FPGA) or other programmable logic devices, discrete gates or transistor logics, discrete hardware components or any combination of these components. The general purpose processor may be a microprocessor. Alternatively, the processor may be any one of a conventional processor, a controller, a microcontroller, or a state machine. The processor may be implemented as combination of computing devices, such as combination of a DSP and a microprocessor, a plurality of microprocessors, one or more microprocessors in conjunction with a DSP core, or any other such configuration.

One of ordinary skill in the art will understand that the above described modules can each be implemented by hardware, or software, a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for submitting an order implemented by a cell phone of a user, wherein the cell phone is coupled with a server via a wireless network, the method comprising:

writing, by the cell phone, an identification code corresponding to a third-party service provider, and transaction information corresponding to a product or service, into a near field communication (NFC) tag;

scanning, by the cell phone, the NFC tag to obtain tag data, wherein the tag data includes at least the identification code corresponding to the third-party service provider and the transaction information corresponding to the product or service;

automatically synthesizing, by the cell phone, the identification code corresponding to the third-party service provider, the transaction information corresponding to the product or service, and user information to generate an order for the user to acquire the product or service from the third-party service provider;

displaying, by the cell phone on a display, the generated order and a menu for confirming the generated order;

receiving, by the cell phone, a user selection from the menu to confirm the generated order;

in response to receiving the user selection from the menu to confirm the generated order, sending, by the cell phone via the wireless network, the generated order to the server, wherein the server processes the generated order to obtain the identification code corresponding to the third-party service provider, the transaction information corresponding to the product or service, and the user information, and to further send the obtained transaction information and the obtained user information to the third-party service provider corresponding to the obtained identification code to complete submission of the generated order for the user to acquire the product or service from the third party service provider; and receiving, by the cell phone via the wireless network, feedback of consumption information of the user from the server, wherein the server performs statistics of the consumption information regarding the user based on the generated order.

2. The method according to claim 1, further comprising:
encrypting, by the cell phone, the user information; and
writing, by the cell phone, the encrypted user information into the NFC tag.

3. The method according to claim 2, further comprising:
decrypting, by the cell phone, the encrypted user information to obtain decrypted user information.

4. The method according to claim 1, further comprising:
obtaining, by the cell phone, the user information from at least one of a local storage of the cell phone or a user input.

5. The method according to claim 1, further comprising:
obtaining, by the cell phone, the user information through a sensor.

6. The method according to claim 1, further comprising:
receiving, by the cell phone from the server or the third-party service provider, real-time order status information generated in accordance with a processing situation of the generated order.

7. A cell phone of a user, wherein the cell phone is coupled with a server via a wireless network, the cell phone comprising:

a processor; and
a memory for storing instructions executable by the processor;
wherein the processor is configured to:
write an identification code corresponding to a third-party service provider, and transaction information corresponding to a product or service, into a near field communication (NFC) tag;
scan the NFC tag to obtain tag data, wherein the tag data includes at least the identification code corresponding to the third-party service provider and the transaction information corresponding to the product or service;
automatically synthesize the identification code corresponding to the third-party service provider, the transaction information corresponding to the product or service, and user information to generate an order for the user to acquire the product or service from the third party service provider;
display, on a display, the generated order and a menu for confirming the generated order;
receive a user selection from the menu to confirm the generated order;
in response to receiving the user selection from the menu to confirm the generated order, send, via the wireless network, the generated order to the server, wherein the server processes the generated order to obtain the identification code corresponding to the third-party service provider, the transaction information corresponding to the product or service, and the user information, and to further send the obtained transaction information and the obtained user information to the third-party service provider corresponding to the obtained identification code to complete submission of the generated order for the user to acquire the product or service from the third party service provider; and
receive, via the wireless network, feedback of consumption information of the user from the server, wherein the server performs statistics of the consumption information regarding the user based on the generated order.

8. The cell phone according to claim 7, wherein the processor is further configured to:
encrypt the user information; and
write the encrypted user information into the NFC tag.

9. The cell phone according to claim 8, wherein the processor is further configured to:
decrypt the encrypted user information to obtain decrypted user information.

10. The cell phone according to claim 7, wherein the processor is further configured to:
obtain the user information from at least one of a local storage of the cell phone or a user input.

11. The cell phone according to claim 7, wherein the processor is further configured to:
obtain the user information through a sensor.

12. The cell phone according to claim 7, wherein the processor is further configured to:
receive, from the server or the third-party service provider, real-time order status information generated in accordance with a processing situation of the generated order.

* * * * *